(12) United States Patent
Mabuchi et al.

(10) Patent No.: US 8,280,910 B2
(45) Date of Patent: *Oct. 2, 2012

(54) DATABASE SERVER CAPABLE OF RELOCATING DATA DISTRIBUTED AMONG PLURAL PROCESSORS AND RETRIEVING DATA METHOD

(75) Inventors: Tsuyoshi Mabuchi, Tokyo (JP); Tetsuo Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 393 days.

This patent is subject to a terminal disclaimer.

(21) Appl. No.: 12/049,092

(22) Filed: Mar. 14, 2008

(65) Prior Publication Data
US 2008/0228779 A1 Sep. 18, 2008

(30) Foreign Application Priority Data
Mar. 16, 2007 (JP) ................................ 2007-068258

(51) Int. Cl.
*G06F 7/00* (2006.01)
(52) U.S. Cl. .................................................... 707/791
(58) Field of Classification Search .................. None
See application file for complete search history.

(56) References Cited

U.S. PATENT DOCUMENTS

| 6,115,802 A * | 9/2000 | Tock et al. ..................... 711/216 |
| 7,031,985 B1 * | 4/2006 | Pecheny ............................... 1/1 |
| 2005/0131957 A1 * | 6/2005 | Watkinson .................... 707/200 |
| 2006/0277541 A1 * | 12/2006 | Sproul et al. .................. 717/174 |
| 2008/0097786 A1 * | 4/2008 | Sachdeva ........................... 705/2 |

FOREIGN PATENT DOCUMENTS

| JP | 9029300 A | 2/1997 |
| JP | 2001142752 A | 5/2001 |
| JP | 2002049602 A | 2/2002 |
| JP | 2003006021 A | 1/2003 |

OTHER PUBLICATIONS

Japanese Office Action for JP2007-068258 Issued on May 15, 2012.

* cited by examiner

*Primary Examiner* — Thu Nga Nguyen

(57) ABSTRACT

A new conversion database associated with information to be finally stored in a host information database is stored in a RAM along with a previous conversion database. Each processing unit refers to the new conversion database to identify data to be held in the host information database of the processing unit itself and refers to the previous conversion database to identify the processing unit which currently holds the data thus identified. The processing unit further relocates the data to be held in the processing unit itself from the processing unit thus identified.

18 Claims, 9 Drawing Sheets

CONVERSION DB1121

| HASH VALUE | PUID |
|---|---|
| 000 | A |
| 001 | B |
| 010 | C |
| 011 | A |
| 110 | B |
| ... | |

FIG. 5A

HOST INFORMATION DB1122

| HASH VALUE | SUBSCRIBER ID | HOST ID |
|---|---|---|
| 010 | aaa@zzz | 2 |
| ... | ... | ... |

FIG. 5B

DATABASE SERVER CAPABLE OF RELOCATING DATA DISTRIBUTED AMONG PLURAL PROCESSORS AND RETRIEVING DATA METHOD

This application is based upon and claims the benefit of priority from Japanese patent application No. 2007-068258, filed on Mar. 16, 2007, the disclosure of which is incorporated herein in its entirety by reference.

BACKGROUND OF THE INVENTION

The present invention relates to a database server capable of relocating data distributed between a plurality of processors.

In a distributed database system constituted by a plurality of CPUs (Central Processing Units) having a storage device, data must be relocated when additional CPUs are provided to accommodate an increase in the amount of data to be processed. In the related art, the relocation of data in such a system has normally resulted in significant burdens on the operation of the same such as a need for stopping the system.

As a solution to the problem, for example, JP-A-9-29300 has disclosed a technique for storing data in a newly provided storage area instead of relocating the data when additional CPUs are provided. However, according to the technique disclosed in the publication, at the time of data retrieval, all CPUs retrieve storage devices provided in themselves. The technique is therefore not so preferable in terms of retrieval efficiency. There are demands for a method which allows relocation of data to be carried out efficiently with retrieval efficiency kept high.

SUMMARY OF THE INVENTION

It is therefore an exemplary object of the invention to provide a database server capable of efficiently relocating data provided in a plurality of processors in a distributed manner.

According to an exemplary aspect of the invention, a database server is provided. The database server includes a plurality of processors, having information stored in a memory provided in each of the plurality of processors in a distributed manner, and capable of relocating the distributed information. Each of the plurality of processors comprises an information storage section, a first processor information storage section, a second processor information storage section, and a storage control section. The information storage section is for storing a different record in each processor based on a hash value, one record being formed by key information, a hash value of the key information, and data which are associated with each other. The first processor information storage section is for storing association between each of the hash values stored in the information storage sections provided in all of the processors and processor identification information identifying the processor having the information storage section in which the hash value is stored. The second processor information storage section is for storing association between each of hash values to be newly stored in the information storing sections provided in all of the processors and processor identification information identifying the processor having the information storing section in which the hash value is to be newly stored. The storage control section is for exercising control to relocate the record therein by referring to the second processor information storing section to acquire the hash value stored in association with the processor identification information identifying the processor itself, acquiring the processor identification information stored in association with the hash value from the first processor information storage section, acquiring the record having the hash value from the information storage section of the processor identified by the processor identification information, and storing the record in the information storing section of the processor itself.

According to another exemplary aspect of the invention, a method of relocating information is provided. The information is stored in a distributed manner in a memory provided in each of a plurality of processors in a database server constituted by the plurality of processors. The method comprises an information storing step executed by an information storage section of each of the processors, a first processor information storing step executed by a first processor information storage section of each of the processors, a second processor information storing step executed by a second processor information storage section of each of the processors, and a storage control step executed by a storage control section of each of the processors. The information storing step is for storing a different record in each processor based on a hash value, one record being formed by key information, a hash value of the key information, and data which are associated with each other. The first processor information storing step is for storing association between each of the hash values stored in the information storage sections provided in all of the processors and processor identification information identifying the processor having the information storage section in which the hash value is stored. The second processor information storing step is for storing association between each of hash values to be newly stored in the information storing sections provided in all of the processors and processor identification information identifying the processor having the information storing section in which the hash value is to be newly stored. The storage control step is for exercising control to relocate the record therein by referring to the second processor information storing section to acquire the hash value stored in association with the processor identification information identifying the processor itself, acquiring the processor identification information stored in association with the hash value from the first processor information storage section, acquiring the record having the hash value from the information storage section of the processor identified by the processor identification information, and storing the record in the information storing section of the processor itself.

According to still another exemplary aspect of the invention, a storage medium having a program recorded therein is provided. The program is for causing each processor of a database server constituted by a plurality of processors to execute an information storing step for storing a different record in each processor based on a hash value, one record being formed by key information, a hash value of the key information, and data which are associated with each other. The first processor information storing step is for storing association between each of hash values stored in all of the processors at the information storing step and processor identification information identifying the processor in which the hash value has been stored at the information storing step. The second processor information storing step is for storing association between each of hash values to be newly stored in all of the processors as a result of the execution of the information storing step and processor identification information identifying the processor in which the hash value is to be newly stored as a result of the execution of the information storing step. The storage control step is for exercising control to relocate the record by acquiring the hash value stored in association with the processor identification information identifying the processor itself from the information stored at the second processor information storing step, acquiring the processor identification information stored in association with the hash value from the information stored at the first processor information storing step, acquiring the record having the hash value from the information stored in the processor identified by the processor identification information at the information storing step, and executing the information storing step by the processor itself to store the record therein.

BRIEF DESCRIPTION OF THE DRAWINGS

FIG. 5A shows an example of a data layout for a conversion database;

FIG. 5B shows an example of a data layout for a host information database;

DESCRIPTION OF THE PREFERRED EMBODIMENT

A preferred embodiment of the invention will now be described with reference to the drawings.

The embodiment of the invention will now be described with reference to an IP telephone system for providing telephone services based on packet communication techniques by way of example. A configuration of the IP telephone system will be first described, and a flow of a call-up process in the IP telephone system will then be described. Thereafter, a description will be made on a flow of data relocation carried out in the IP telephone system which executes such a call-up flow.

Figure 1:
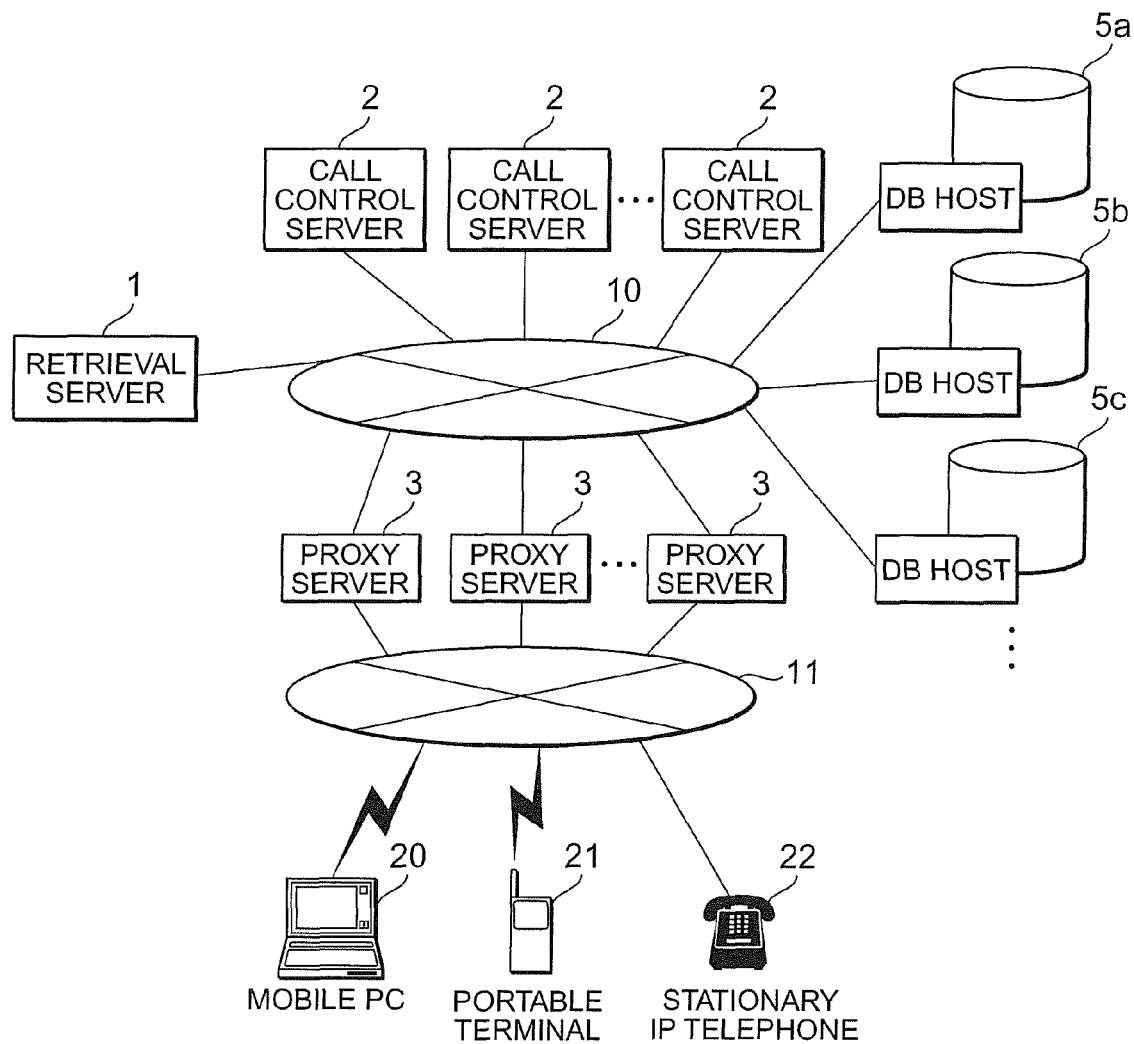
FIG. 1 is a block diagram showing an example of a configuration of an IP telephone system according to an exemplary embodiment of the invention.

FIG. 1 is a block diagram showing an example of a configuration of an IP telephone system according to the exemplary embodiment of the invention. As shown in FIG. 1, the IP telephone system is configured by connecting an internal network 10 to an external network 11 through a proxy server 3. A call control server (computer) 2, a retrieval server 1, and a plurality of database (hereinafter abbreviated as DB) hosts 5a to 5c are connected to the internal network 10. A call request from an IP telephone terminal such as a mobile PC (personal computer) 20, portable terminal 21, or stationary IP telephone 22 using the IP telephone system is received by the call control server 2 through the external network 11 and the proxy server 3 and processed by the call control server 2.

Although FIG. 1 shows three DB hosts, the number of the DB hosts is not limited to three. Similarly, a plurality of the call control servers 2 and proxy servers 3 may be connected to the system. In the IP telephone system of the present embodiment, each of the plurality of proxy servers transmits a request from a mobile PC 20, portable terminal 21, or stationary IP telephone 22 to any of the plurality of call control servers 2.

Each component of this IP telephone system will now be described in detail.

The proxy servers 3 are servers for enabling single source management of communications between the internal network 10 and the external network 11 in order to prevent unauthorized access to the internal network 10 from the external network 11. All requests for use of IP communication services from the mobile PCs 20, portable terminals 21, and stationary IP telephones 22 are transmitted to the call control servers 2 through the proxy servers 3. The call control servers 2 are servers for calling a call destination address specified by a mobile PC 20, portable terminal 21, or a stationary IP telephone 22 to establish a call between the call source and the call destination.

Figure 2:
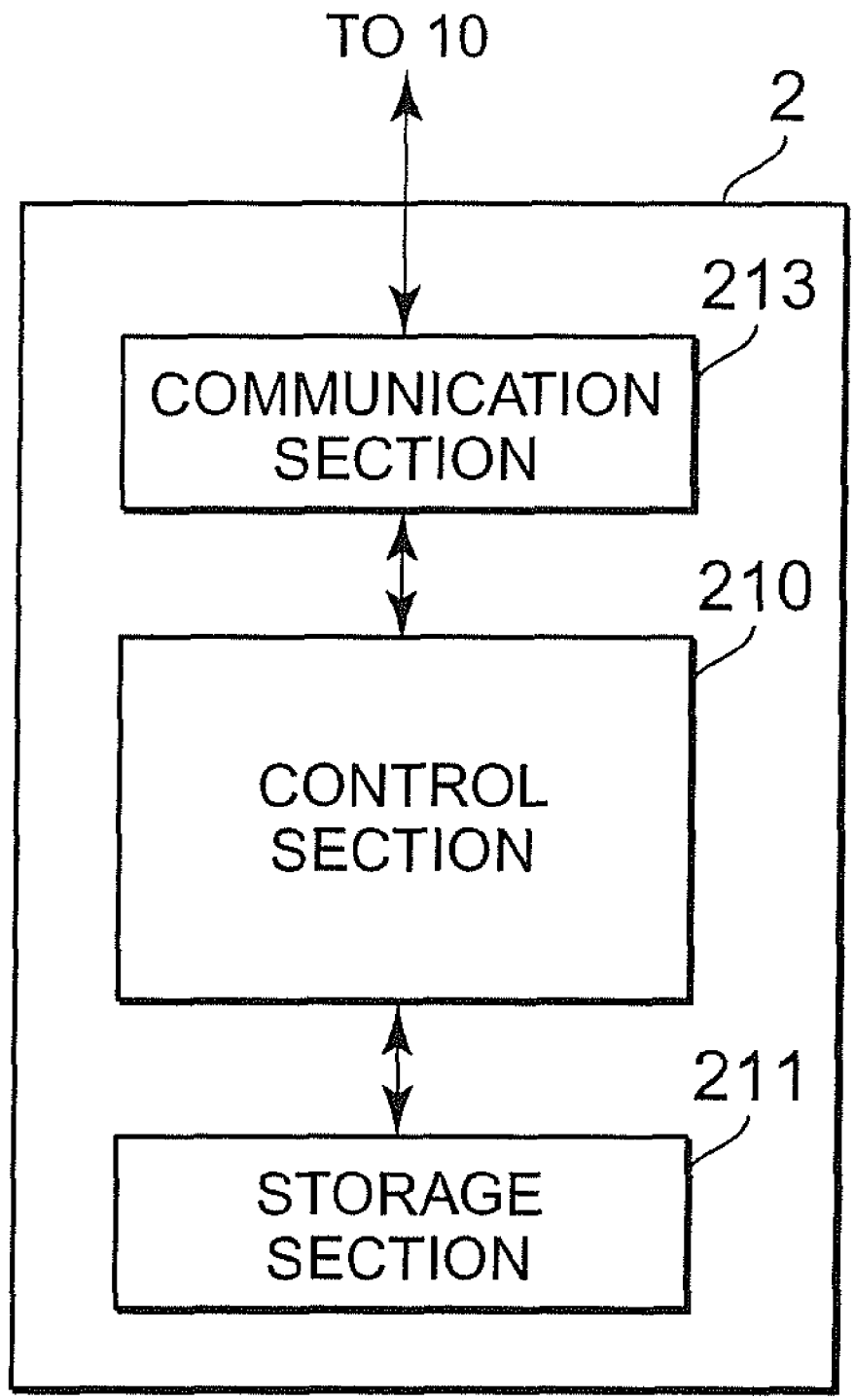
FIG. 2 is a block diagram showing an example of a configuration of a call control server shown in FIG. 1.

As shown in FIG. 2, a call control server 2 includes a control section (data acquisition section) 210, a storage section 211, and a communication section 213.

The control section 210 is constituted by a CPU, an ROM (Read Only Memory), and an RAM (Random Access Memory) which are not shown, and controls the whole of call control server 2. Specifically, the CPU executes programs stored in the ROM and the storage section 211, which will be described later, to perform control and calculation processes. When the control and calculation processes are performed, the control section 210 temporarily stores various types of data in the RAM to use it as a work area.

The storage section 211 is constituted by a hard disk or the like, and programs stored in the section include programs used by the control section 210 for executing a process of authenticating a calling subscriber and establishing a call.

The communication section 213 includes a communication interface, and it is provided for communicating with the retrieval server 1 which will be described later and the DB hosts 5a to 5c through the internal network 10. The communication section 213 may also include a modem device and an infrared communication device.

Figure 4:
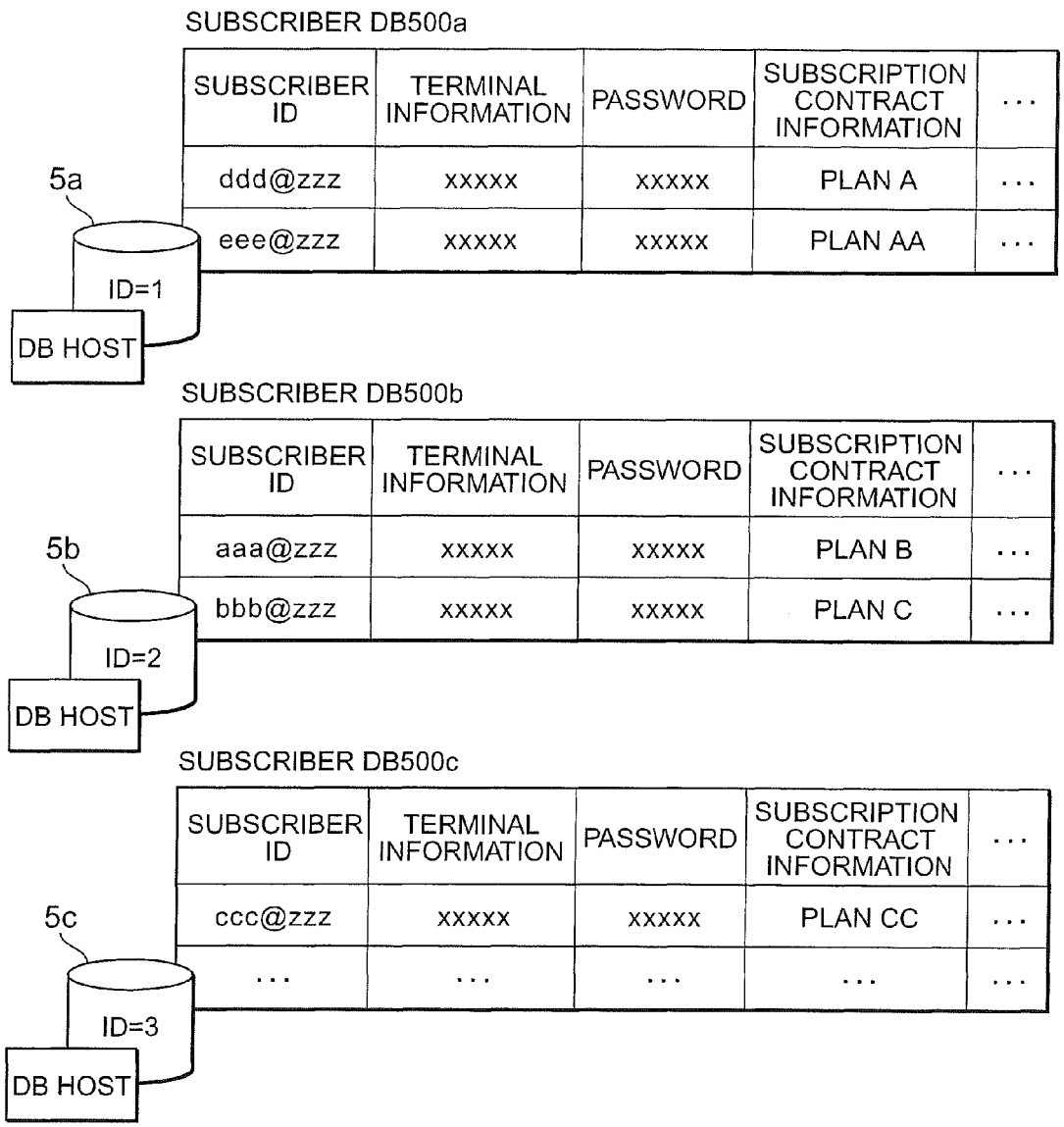
FIG. 4 shows an example of a data layout for subscriber information databases.

The DB hosts 5a to 5c are host computers having information on subscribers of telephone services provided by the IP telephone system. As shown in FIG. 4, the DB hosts 5a to 5c include subscriber DBs (information storage section) 500a to 500c in which the subscriber information is stored in a distributed manner.

Specifically, in each record in the subscriber DBs 500a to 500c, information on a subscriber such as terminal information, password, and subscription contract information are stored in association with subscriber ID (key information or client address). Subscriber ID is identification information for identifying a subscriber to the IP telephone services. Terminal information is identification information for identifying a terminal used by a subscriber. Subscription contract information is information indicating a charge plan or discount plan on which a subscriber has made a contract.

The retrieval server 1 is a server which performs a host retrieval process, i.e., a process of identifying a host having subscriber information requested by a call control server 2 from among the DB hosts 5a to 5c and returning the ID (identification information) of the host in response to a host retrieval request from the call control server 2.

A plurality of subscriber information are stored in each of the DB hosts 5a to 5c in a distributed manner. Therefore, in order to acquire desired subscriber information efficiently, a call control server 2 must know which of the DB hosts 5a to 5c has the desired information stored therein, and such information is provided by the retrieval server 1.

When a call control server 2 transmits a host retrieval request to the retrieval server 1 by specifying subscriber ID, the host ID of a DB host 5 having the subscriber information identified from the subscriber ID is returned. The call control server 2 can acquire the subscriber information efficiently by inquiring of the DB host 5 identified by the returned host ID about the subscriber information.

Figure 3:
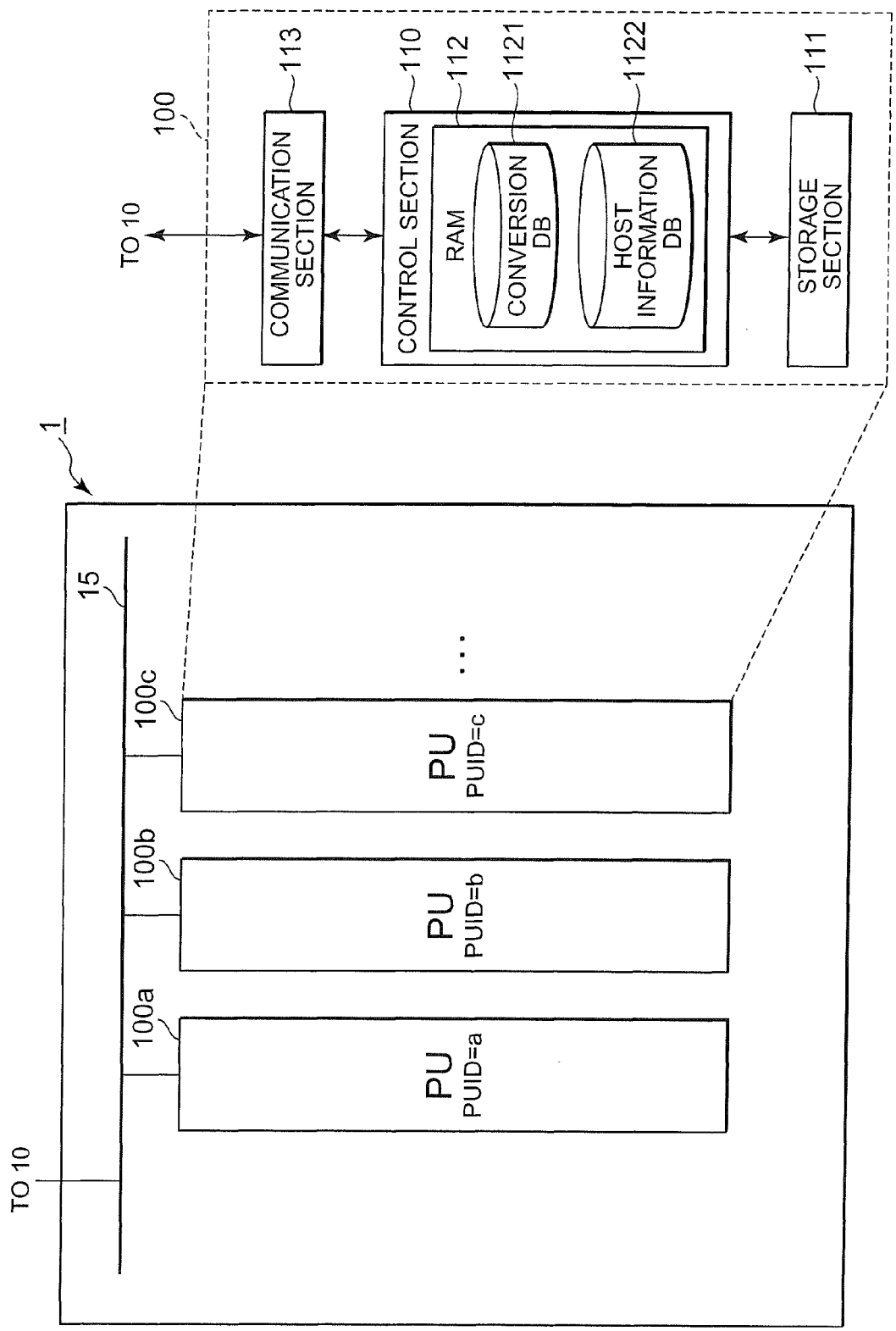
FIG. 3 is a block diagram showing an example of a configuration of a retrieval server shown in FIG. 1.

In executing a call-up process, the call control sever 2 always inquires of the retrieval server 1 about the DB hosts 5 (a host retrieval request). Therefore, in order to prevent such a host retrieval request from constituting a bottleneck of a call-up process, the retrieval server 1 has what is called multi-processor system configuration in which a plurality of PUs (Processing Units) 100a to 100c are connected to a bus 15 as shown in FIG. 3. The PUs cooperate in parallel to process a host retrieval request. Although the retrieval server 1 is shown as having three processors (PUs) in FIG. 3, the invention is not limited to such a configuration, and what is required is that at least one processor is provided. Since the plurality of PUs 100a to 100c operate in parallel to process the host retrieval request from the call control server 2, the host retrieval process can be executed at a high speed. A specific flow of a host retrieval process will be described in detail in the following description of operations of the retrieval server 1.

A configuration of the PUs 100a to 100c provided in the retrieval server 1 will now be described. Each of the PUs 100a to 100c includes a control section (storage control section) 110, a storage section 111, an RAM 112, and a communication section 113.

The control section 110 is constituted by a CPU (not shown), an ROM (not shown), and the RAM 112 and controls the PU 100 and cooperates with the control sections of the other PUs by exchanging information through the bus 15 to control the whole of retrieval server 1. Specifically, the CPU executes programs stored in the ROM and the storage section 111, which will be described later, to perform control and calculation processes. When the control and calculation processes are executed, the control section 110 temporarily stores various types of data in the RAM 112 to use it as a work area.

A conversion DB (processor information storage section) 1121 and a host information DB (linformation storage section) 1122 are also stored in the RAM 112 as in-memory DBs.

As shown in FIG. 5B, hash values, subscriber ID, host ID are stored in association with each other in the host information (host information table) DB 1122. A hash value is a result obtained by applying a hash function to subscriber ID identifying a subscriber to services provided by the IP telephone system. The subscriber ID is information identifying the subscriber. Host ID is information identifying the DB host 5 in which subscriber information on the subscriber identified by the subscriber ID is stored.

A hash function is a function providing numerical values which are limited to a certain range. As a result of the use of a hash function, any subscriber ID is divided into several sets of data each having the same hash value. Data are stored in the host information DB 1122 of each PU 100 in a distributed manner according to hash values. Although a remainder calculation is normally used as a hash function, the invention is not limited to such a function, and any function may be used as long as it provides numerical values limited to a certain range.

As shown in FIG. 5A, PUID (Processor Unit ID; PU identification information) is stored in association with each record in the conversion DB (processor information table) 1121, a hash value serving as a key for such association. A hash value is calculated from subscriber ID and is stored in the conversion DB 1121 as a key of each PUs 100. PUID is information which identifies the PU having stored therein the host ID identifying the DB host 5 having subscriber information identified by the subscriber ID from which the hash value has been calculated. That is, data to be stored in the host information DB 1122 of each PU 100 are determined based on hash values, and association between hash values and the PUs 100 is stored in the conversion DBs 1121.

All hash values calculated from subscriber ID are stored in the conversion DBs 1121 as key information. Conversion DBs 1121 having the same contents are stored in the RAMs 112 of the respective PUs 100a to 100c. Since hash values obtained from subscriber ID are used as key information, the conversion DB 1121 having the same contents can be stored in the RAMs 112 provided in all of the PUs 100a to 100c as thus described.

The storage sections 111 of the PUs 100a to 100c are constituted by hard disks or the like, and programs used by the control sections 110 to execute retrieval processes are stored in those sections. Since the contents of the conversion DBs 1121 and the host information DBs 1122 which are in-memory DBs stored in the RAMs 112 are erased when the power supply is turned off, backups for the DBs are also stored in the storage sections 111.

The communication sections 113 of the PUs 100a to 100c include a communication interface, and they are provided for communication with the call control server 2 through the internal network 10. The communication section 113 may include a modem device or an infrared communication device.

Figure 6:
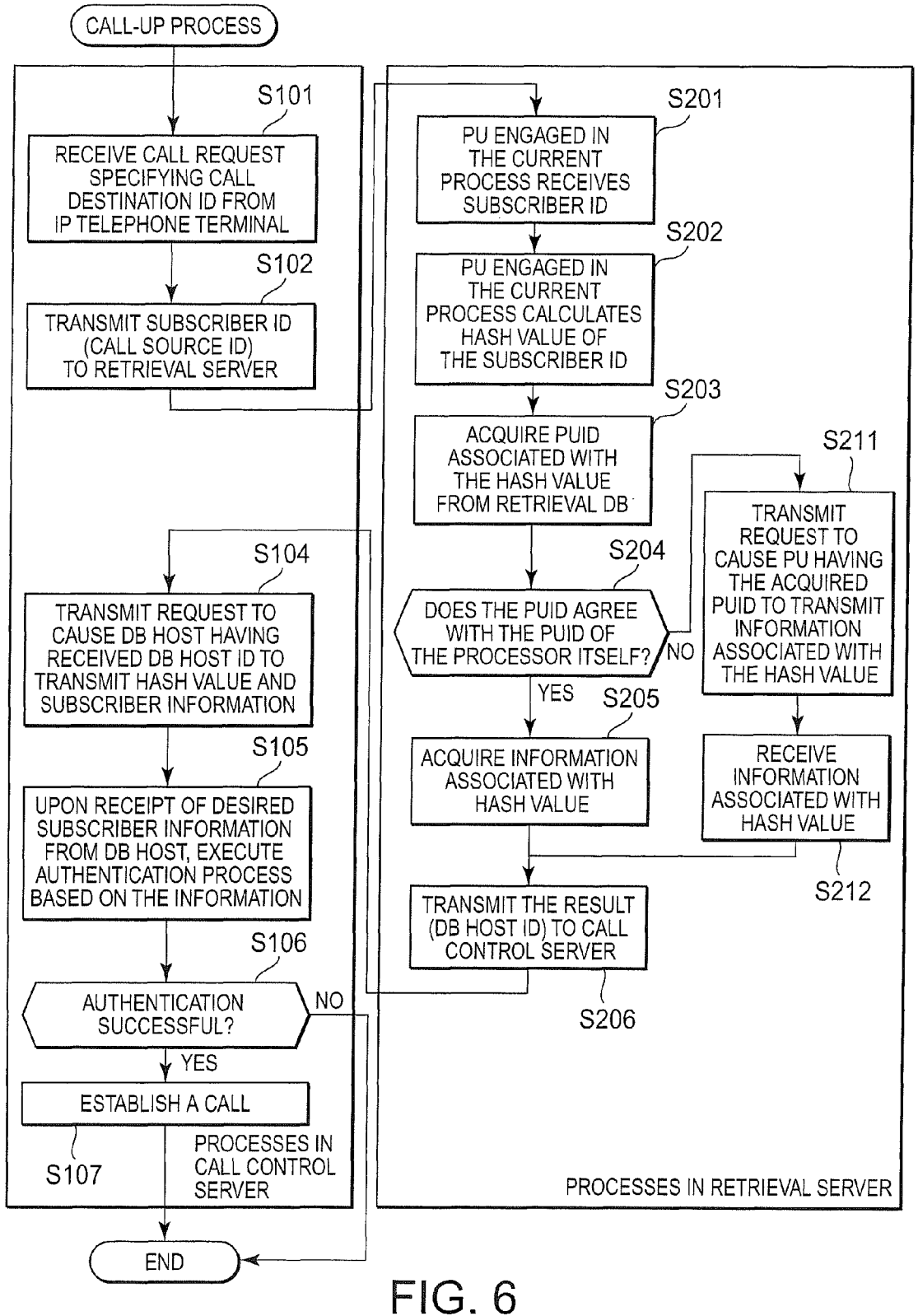
FIG. 6 is a flow chart showing processes in a retrieval server according to the exemplary embodiment of the invention.

A description will now be made with reference to FIG. 6 on a flow of a call-up process executed by the call control server 2 based on information stored in the various types of DBs described above. In the following description, the mobile PCs 20, portable terminals 21, and stationary IP telephones 22 will be collectively referred to as IP telephone terminals.

An IP telephone terminal (a mobile PC 20, portable terminal 21, or stationary IP telephone 22) transmits a call request to a call control server 2 through a proxy server 3 by specifying a call destination ID (the subscriber is not required to be a subscriber to services provided by the IP telephone system). When the call request is transmitted, information including the subscriber ID of the call source, the password for authentication, and information identifying the IP telephone terminal stored in the IP telephone terminal of the call source are simultaneously transmitted. Upon receipt of the call request (step S101), the call control server 2 transmits the subscriber ID of the call source to the retrieval server 1 and makes an inquiry (a host retrieval request) about the host ID of the DB host 5 having the subscriber information identified by the subscriber ID (step S102).

The call control server 2 executes a call-up process based on a protocol referred to as SIP (Session Initiation Protocol) and utilizes SIP addresses used in the SIP protocol to specify the call source and the call destination. An SIP address has a form resembling an E-mail address, e.g., "user ID@SIP domain name". Such SIP addresses are used as subscriber ID. The IP telephone call-up process may be performed using a protocol other than SIP. In such a case, telephone numbers or the like may be used as ID of the call source and the call destination instead of SIP addresses.

A description will now be made on a flow of processes performed by the retrieval server 1 on host retrieval requests from the call control servers 2.

The PUs 100a to 100c of the retrieval server 1 have a program for distributing loads (load distribution program) stored in the respective storage sections 111. Control is exercised such that the PUs sequentially accept and process inquiries (host retrieval requests) from the call control severs 2. When a next retrieval request is transmitted before one PU 100 finishes the current retrieval process, another PU 100 performs the other host retrieval process in parallel. Methods for process distribution are set in advance to allow selection of a round-robin method and other methods, e.g., a method in which a process is allocated to the PU 100 having the lightest load at the point in time of interest.

The control section 110 of the PU 100 which has been determined to undertake the current process by the load distribution program first receives the call source ID (subscriber ID) of the call source and the call destination ID from the call control server 2 (step S201). Then, the control section 110 engaged in the current process calculates the hash value of the subscriber ID thus received (step S202) and retrieves the conversion DB 1121 to acquire PUID associated with the calculated hash value (step S203). If the acquired PUID agrees with the ID of the PU to which the control section belongs (step S204; Yes), the control section 110 refers to the host information DB 1122 of the RAM 112 of itself to acquire host ID associated with the calculated hash value and the subscriber ID (step S205).

If the PUID acquired at step S203 is the PUID of another PU (step S204; No), the other PU having the PUID is requested to transmit the host ID associated with the hash value and the subscriber ID (step S211). Upon receipt of the request, the other PU refers to the host information DB 1122 of the control section 110 of itself and transmits the host ID of interest to the request source. Upon receipt of the transmitted host ID (step S212), the control section 110 of the PU 100 engaged in the current process returns the result to the call control server 2 (step S206).

Figures 7A, 7B:
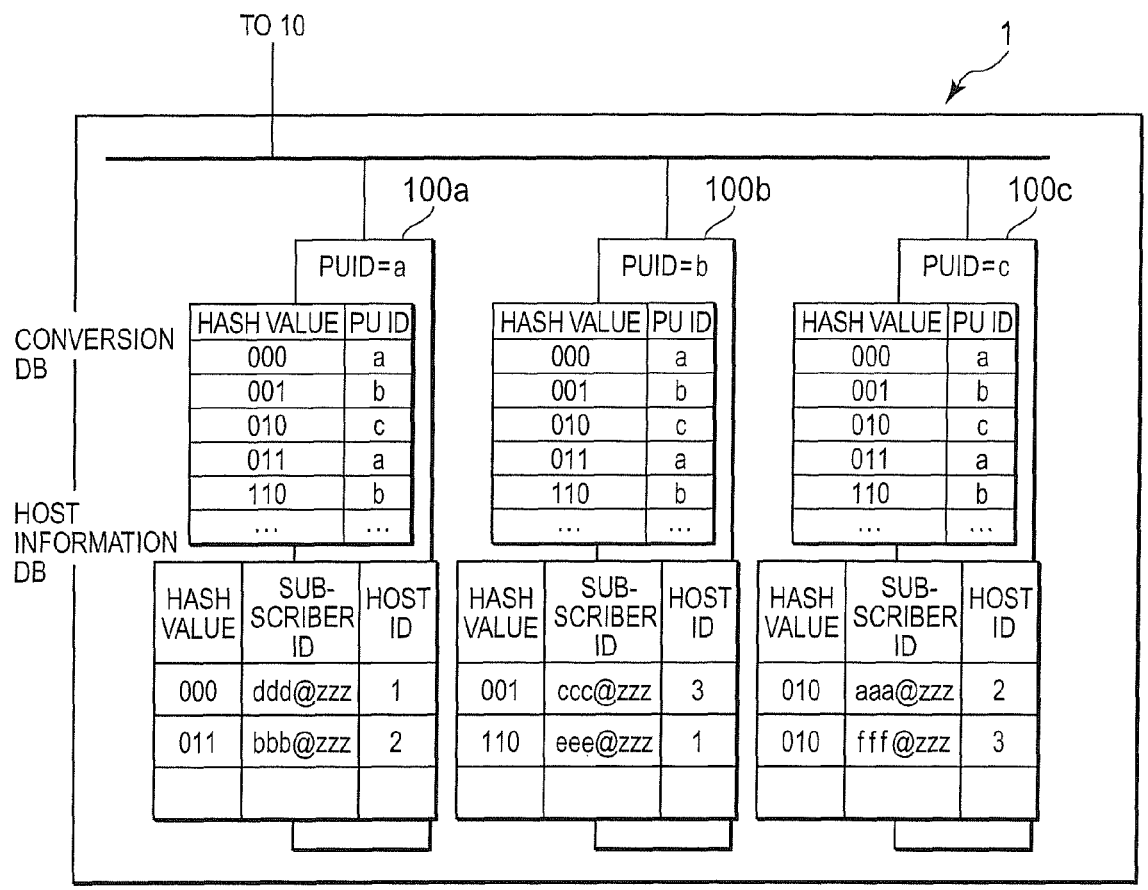
FIG. 7A is an illustration for explaining a conversion process for acquiring hash values from subscriber ID.
FIG. 7B is an illustration showing contents of conversion databases and host information databases held by a plurality of processing units in a retrieval server.

The processes at the above-described steps S101 and S102, and steps S202 to S212 will now be described using a specific example. Let us assume that the PU 100a having PUID "a" receives a host retrieval request concerning host ID of a DB host 5 having subscriber information including subscriber ID "aaa@zzz" from a call control server 2. Let us also assume that subscriber IDs are associated with hash values as shown in FIG. 7A at this time and that the conversion DBs 1121 and the host information DBs 1122 provided in the PUs 100a to 100c have contents as shown in FIG. 7B. Then, the PU 100a first calculates the hash value of the subscriber ID "aaa@zzz". Since the hash value calculated from the subscriber ID "aaa@zzz" is "010" as shown in FIG. 7A, the PU 100a refers to the conversion DB 1121 to search for PUID associated with the hash value "010". The PUID associated with the hash value "010" is "c". Therefore, the PU 100a judges that the unit itself does not have host information associated with the hash value "010". The hash value and the subscriber ID "aaa@zzz" are transmitted to the PU 100c whose PUID is "c" to request it to return the host information (host ID). Upon receipt of the request, the PU 100c refers to the host information DB 1122 and transmits "2", which is the host ID stored in association with the hash value "010" and the subscriber ID "aaa@zzz" thus received, to the call control server 2.

Upon receipt of the host ID from the retrieval server 1, the call control server 2 transmits the subscriber ID to the DB host 5 identified by the received host ID and inquires of the host to request it to transmit subscriber information associated with the subscriber ID (step S104). Upon receipt of the inquiry, the DB host 5 refers to the subscriber DB 500 (see FIG. 4) to acquire all subscriber information associated with the subscriber ID and returns them to the call control server 2.

For example, in the case of the subscriber ID "aaa@zzz" described above, the call control server 2 inquires of the DB host 5b (see FIG. 4) that is identified by host ID "2", and the DB host 5b refers to the subscriber DB 500b to return subscriber information associated with the subscriber ID "aaa@zzz" to the call control server 2.

The call control server 2 checks the password and terminal information included in the received subscriber information against information transmitted from the IP telephone terminal (which is a mobile PC 20, portable terminal 21 or stationary IP telephone 22) through the proxy server 3 to authenticate the call source (step S105). When the authentication of the password and terminal information is successful (step S106; Yes), a call request is sent to the call destination ID transmitted from the IP telephone terminal based on the SIP protocol to establish a call (step S107). When the authentication fails, the call-up process is terminated (step S106; No). The charging is carried out based on subscription contract information received form the DB host 5.

As described above, the DB hosts 5a to 5c hold subscriber information in a distributed manner. The retrieval server 1 accepts and processes inquiries on which of the DB hosts 5a to 5c has desired subscriber information stored therein (host retrieval requests). The retrieval server 1 includes a plurality of PUs which execute processes in parallel, and inquiries can therefore be processed at a high speed. Further, inquiry processes can be carried out at a high speed because the conversion DBs 1121 and the host information DBs 1122 are in-memory DBs. Since the RAM 112 of the control section 110 of each PU has a limited capacity, the host information DB 1122 is stored in each PU 100 in a distributed manner, and the conversion information DB 1121 is stored in all of the PU 100. Thus, a call control server 2 can efficiently acquire subscriber information from a DB host 5 based on host ID obtained by inquiring of the retrieval server 1.

(Data Relocation Process)

A description will now be made on a method of efficiently relocating data when additional processors are provided in the retrieval server 1 having the above-described configuration. The use of the method according to the present embodiment is advantageous in that data can be relocated without stopping services provided by the retrieval server 1.

By way of example, the present embodiment will be described as a case in which a PU 100x having ID "x" is newly added to the retrieval server 1. In this case, data are relocated such that contents as shown in the lower part of FIG. 9B will be finally stored in a host information DB (host information table) 1122 provided in the PU 100x.

In the present embodiment, a new conversion DB (second processor information storage section or new conversion table) 1121' (see the lower part of FIG. 9A) associated with the information to be finally held in the host information DB 1122 is stored in the RAM 112 along with the previous conversion DB (first processor information storage section or previous conversion table) 1121. Then, the PUs 100 refer to both of the new and previous DBs 1121' and 1121 during relocation of data.

A flow of data relocation will now be specifically described with reference to FIG. 8.

As described above, the present embodiment is based on an assumption that an additional PU 100x is newly provided in the retrieval server 1. It is also assumed that the installation of an OS (Operating System) and the creation of a DB table in the PU 100x has already been completed.

In such a state, a manager establishes connection between a terminal (not shown) connected to the internal network 10 and the retrieval server 1. Then, a file having data to be inserted into the new conversion DBs 1121' is specified, and a data relocation command is executed on the retrieval server 1. Any one of the PUs 100a to 100c and 100x serves as a master PU which controls the other PUs 100. The manager executes the relocation command which activates a data relocation process program stored in the storage section 111 of the master PU, whereby a data relocation process is started. It is assumed that the file having the information to be inserted into the new conversion DBs 1121' is stored by the manager in advance in the storage section 111 of the master PU.

The master PU may be controlled by others while serving as a controller for the other PUs.

Figure 8:
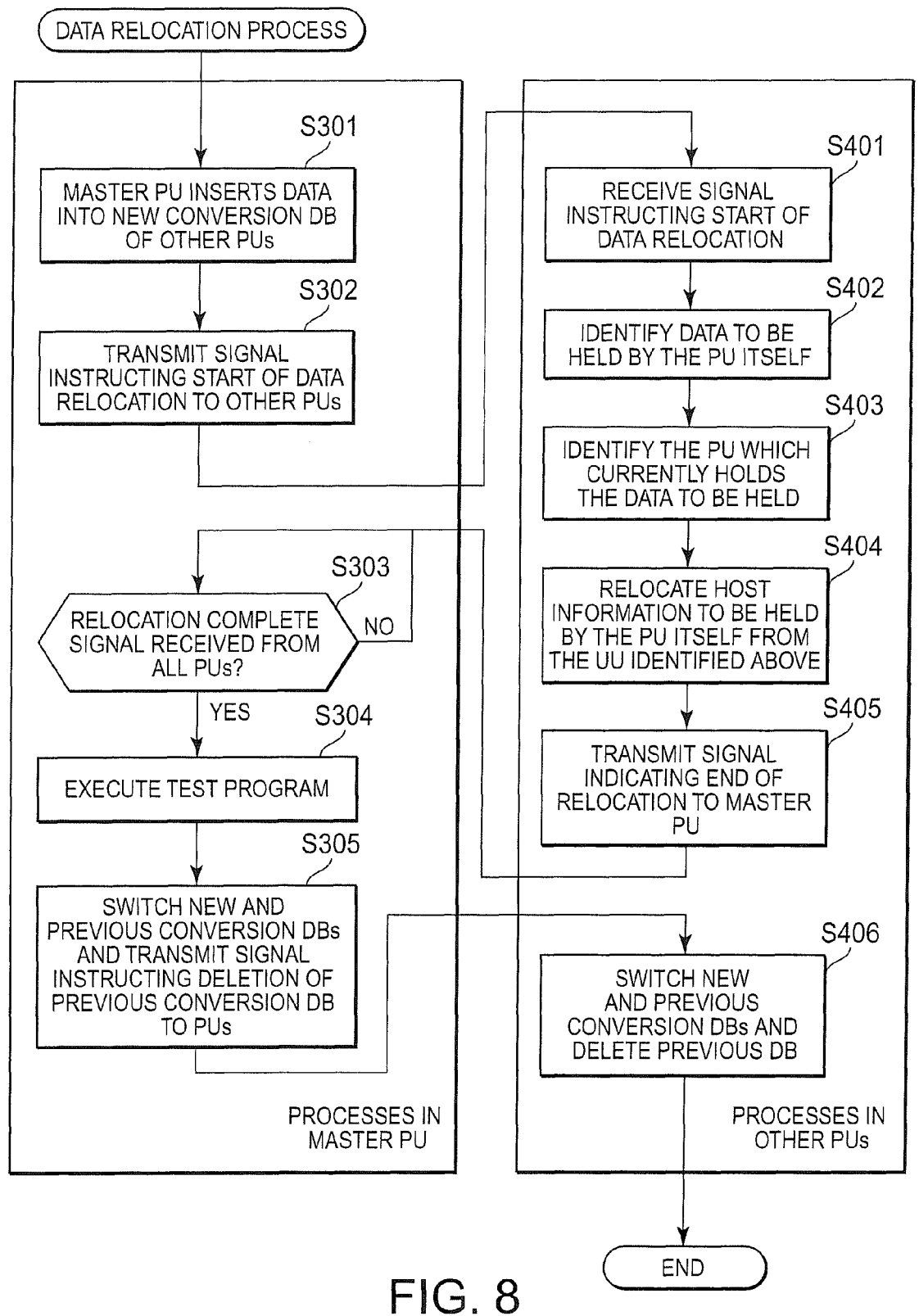
FIG. 8 is a flow chart showing processes for relocating data to a newly provided processing unit (PU) in a retrieval server according to the exemplary embodiment of the invention.

When the data relocation process program is executed, the retrieval server 1 performs processes as shown in FIG. 8. First, the control section 110 of the master PU inserts the contents of the specified file into the new conversion DBs 1121' of all other PUs 100 (step S301). When the insertion of data is completed, the master PU transmits a signal to each PU 100 to instruct it to perform a data relocation process for acquiring data to be held in the PU from other PUs 100 based on the new conversion DB 1121' (step S302).

Upon receipt of the data relocation process signal (step S401), each PU 100 starts a data relocation process. First, each PU 100 refers to the new conversion DB 1121' to identify data to be held in the host information DB 1122 of the PU itself (step S402). Next, the PU refers to the previous conversion DB1121 to identify the PU 100 which currently holds the data thus identified (step S403). Then, the PU relocates the data to be held by the PU itself from the PU 100 thus identified (step S404).

Figure 9A:
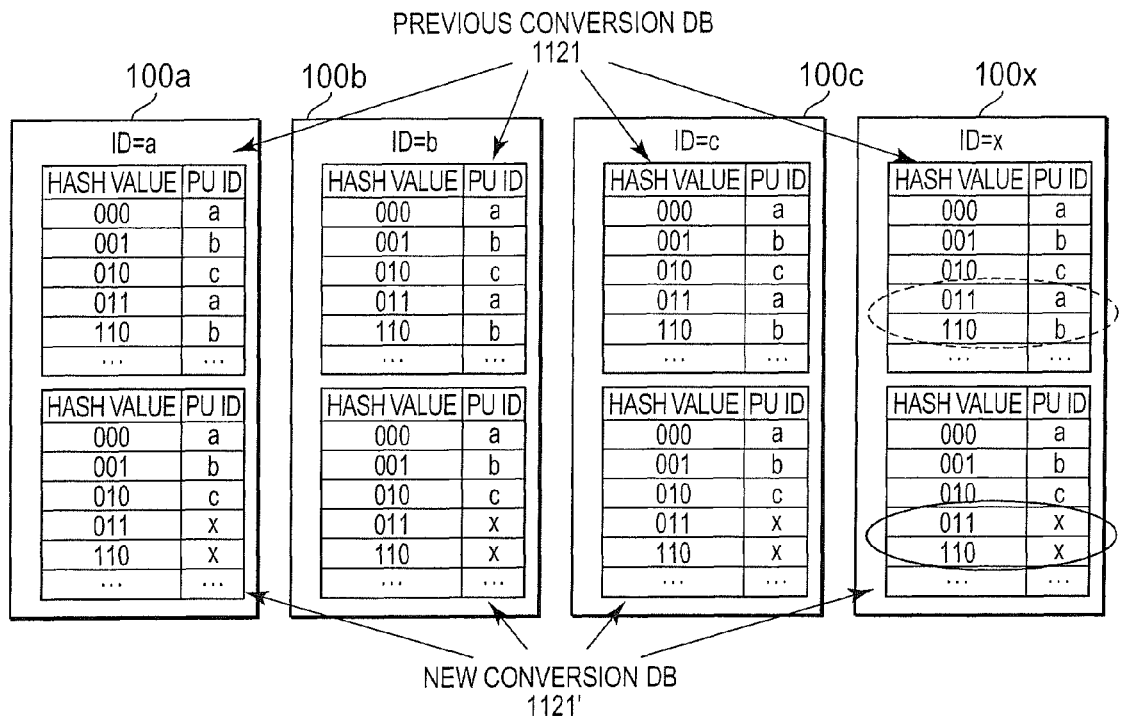
FIG. 9A shows new and previous conversion tables held in various processing units (PUs) when data are relocated to a newly provided PU.
Figure 9B:
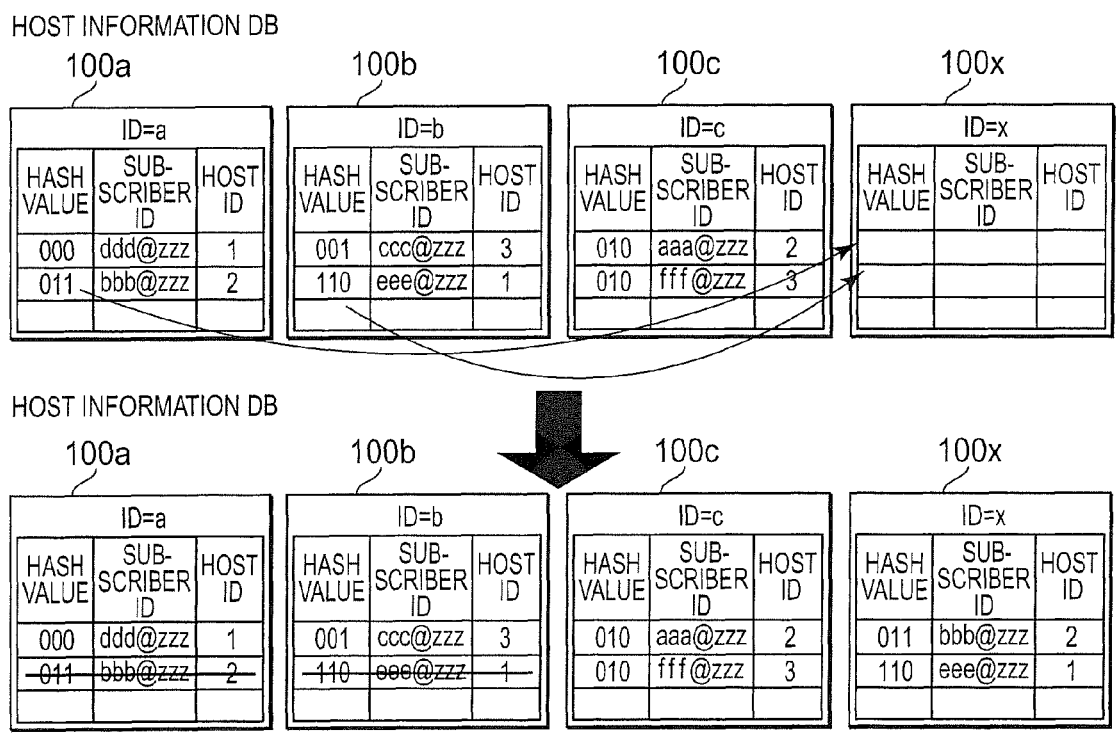
FIG. 9B shows layouts of data in host information databases (DBs) in the PUs before and after the data relocation.

For example, let us assume that the new conversion DBs 1121' and the previous conversion DBs 1121 held in the PUs 100 have data shown in the lower and upper parts of FIG. 9A, respectively, and that the host information DBs 1122 have data as shown in the upper part of FIG. 9B. Then, the PU 100x having PUID "x" refers to the new conversion DB 1121' held in its own RAM 112 and recognizes that the PU must hold host information stored in association with hash values 011 and 110 in itself (see the part enclosed in an oval). Therefore, the control section 110 of the PU 100x then refers to the previous conversion table 1121 held in the RAM 112 of itself to find the PUs 100 which actually hold the host information associated with the hash values 011 and 110. As a result, it is found that the PU 100a having PUID "a" holds the host information associated with the hash value 011 and that the PU 100b having PUID "b" holds the host information associated with the hash value 110 (see the part enclosed in an oval in a dotted line). Thus, the PU 100x acquires the host information associated with the hash values 011 and 110 from the host information DBs 1122 of the PUs 100a and 100b, respectively. When the host information is acquired, the PU 100x stores the information in the host information DB 1122 of itself. Finally, data as shown in the lower part of FIG. 9B are stored in the host information DB 1122 of each PU 100.

A host retrieval request can be processed even when the retrieval server 1 receives the host retrieval request from a call control server 2 during a data relocation process. The PU 100 which has accepted the inquiry from the call control server 2 first refers to the previous conversion DB 1121. Then, the PU transmits a request to the PU 100 having PUID associated with a hash value of subscriber ID received along with the host retrieval request to urge the PU to return the host information. When the host information associated with the hash value of the subscriber ID is stored in the host information DB 1122 held by the PU 100 which has received the request, the host information is returned to the requester. When the PU 100 which has received the request does not have the desired host information, it means that the data has already been relocated. Then, the PU 100 which has accepted the inquiry from the call control server 2 refers to the new conversion DB 1121' and transmits a request for returning of the host information to the PU 100 having the PUID associated with the hash value of the subscriber ID. Since the desired host information should exit in the PU 100 having the PUID associated with the hash value stored in the new conversion DB 1121', the PU 100 which has accepted the inquiry from the call control server 2 can acquire the host information. Since each PU holds two conversion DBs, i.e., the new conversion DB 1121' and the previous conversion DB 1121 as thus described, desired data can be acquired by referring to the new conversion DB 1121' even when data has already been relocated.

When relocation of data is completed at each PU 100, the PU 100 transmits a signal to the master PU to indicate the completion of the relocation (step S405). When the signal indicating the completion of data relocation is received from all PUs 100 (step S303; Yes), the master PU executes a test program to verify that all pieces of data have been properly relocated (step S304). When the verification is successful, the control section 110 of the master PU transmits a signal to instruct the other PUs to delete the contents stored in the previous conversion DBs 1121 (step S305) after replacing the previous conversion DB 1121 with the new conversion DB 1121'. Upon receipt of the deletion signal, each PU 100 replaces the previous conversion DB 1121 with the new conversion DB 1121' to-delete and deletes the previous conversion DB 1121, whereby the relocation process is completed (step S406). The previous conversion DB 1121 may be replaced with the new conversion DB 1121' by exchanging pointers into the previous conversion DB 1121 and the new conversion DB 1121' or exchanging the data contents themselves. Other methods may be also used.

A description has been made above on a method of efficiently relocating data in the retrieval server 1 in which data are held in a plurality of processors in a distributed manner. The use of this method allows data to be relocated between the processors without stopping services provided by the retrieval server 1 and with minimum impact on the call control servers 2 and the telephone system as a whole associated with the present embodiment.

Although the present embodiment has been described as an instance of relocation of data to an additional processor, the invention is not limited to data relocation to an additional processor, and data held by each processor can be relocated by taking steps similar to those described above.

Although a preferred embodiment of the invention has been described above, the invention is not limited to the above-described embodiment and may be implemented in various forms of modification and application.

For example, a database system for applications other than IP telephones may be constructed using the host DBs 5 and the retrieval server 1. That is, arbitrary types of data may be held in the host DBs 5. The retrieval server 1 may hold layout information indicating the locations among the plurality of host DBs 5 where the arbitrary types of data are stored.

The retrieval server 1 may be used alone as a database server instead of storing the layout information in the same.

The above embodiment has been described as a case in which control programs of the retrieval server 1 are stored in the storing section in advance. Alternatively, the retrieval server 1 may be provided with any appropriate device for reading storage media such as flexible disks, CD-ROMs (Compact Disk Read-Only Memories), DVDs (Digital Versatile Disks), MOs (Magneto-Optical disks) and USB memories, and control programs may be stored in such storage media for distribution. An apparatus enabled for execution of the above-described processing operations by installing such programs may be provided.

The control programs may alternatively be stored in advance in a disk device provided in a predetermined server apparatus on the internal network 10 or external network 11 and may be downloaded to the retrieval server 1. Further, the above-described processes may be carried out by activating and executing the programs while transferring them through the internal network 10 or external network 11.

Although an exemplary embodiment of the invention has been described above, the invention is not limited to the above-described embodiment and may be implemented in various forms of modification and application.

For example, the retrieval server 1 of the above-described embodiment may be implemented in the form of dedicated hardware instead of the configuration in which control is exercised through execution of a program at each control section.

What is claimed is:

1. A database server including a plurality of processors capable of being added, having information stored in a memory provided in each of the plurality of processors in a distributed manner, and capable of retrieving and relocating the distributed information, each of the plurality of processors being a given processor and comprising:

an information storage section to store a different record in each processor based on a given hash value of a plurality of hash values, one record being formed by key information, the given hash value of the key information, and data which are associated with each other;

a first processor information storage section to store current association between each of the plurality of hash values currently stored in the information storage sections provided in all of the plurality of processors and processor identification information identifying the given processor having the information storage section in which the given hash value is currently stored;

a second processor information storage section to store new association between each of the plurality of hash values to be newly stored in the information storing sections provided in all of the plurality of processors including an added processor and processor identification information identifying the given processor having the information storing section in which the given hash value is to be newly stored;

a retrieving unit to execute a retrieval process upon receipt of the key information as a condition for retrieval from outside, the retrieval process comprising the steps of calculating the given hash value from the key information, acquiring the processor identification information associated with the given hash value from the first processor information storage section, and acquiring data associated with the given hash value when the given hash value is stored in the information storing section of the given processor identified by the processor identification information; and a storage control section to exercise control to relocate the record therein by referring to the second processor information storage section to acquire the given hash value stored in association with the processor identification information identifying the given processor itself, acquiring the processor identification information stored in association with the given hash value acquired from the first processor information storage section, acquiring the record having the given hash value from the acquired information storage section of the given processor identified by the processor identification information, and storing the acquired record in the information storing section of the given processor itself;

wherein the retrieving unit executes the retrieval process with using at least the first processor information storage section until the storage control section completes relocation of the record among the plurality of processors with using the first processor information storage section and the second processor information storage section after the added processor is added;

wherein the plurality of processors serve as a master processor and remaining slave processors, respectively;

the master processor inserts new association between each of the plurality of hash values to be newly stored in the plurality of information storing sections provided in all of the plurality of processors including the added processor and processor identification information identifying the given processor having the information storing section in which the given hash value is to be newly stored, as update information to be stored in the second processor information storage section of each of the slave processors;

the second processor information storage section of each of the slave processors stores the inserted update information when the update information is inserted from the master processor; and when the storage of the inserted update information in the second processor information storage section is completed, the storage control section of each of the slave processors starts relocating records from the information storing sections of other processors to the given processor itself based on the processor identification information stored in the second processor information storage section.

2. A database server according to claim 1 wherein the retrieving means executes a the retrieval process, the retrieval process further comprising the step of acquiring the processor identification information associated with the given hash value from the second processor information storage section when the given hash value is not stored due to the data relocation among processors partly done in the information storage section of the given processor identified by the processor identification information acquired from the first processor information storage section and acquiring data associated with the key information and the given hash value from the information storage section provided in the given processor identified by the processor identification information acquired from the second processor information storage section.

3. A database server according to claim 1, wherein:

each of the plurality of processors transmits a signal notifying the master processor of the completion of relocation when the storage control section has completed relocation of all records; and the master processor exercises control to delete contents stored in the first processor information storage sections and to effect switching between the second processor information storage sections and the first processor information storage sections when the signal indicating the completion of relocation of records is received from the signal transmission section of all the plurality of processors.

4. A database server according to claim 2, wherein the plurality of processors execute the retrieval process according to a preset order.

5. A database server according to claim 4, wherein the order in which the plurality of processors execute the retrieval process is based on a round-robin method.

6. A database server according to claim 1, wherein the information storage section and the processor information storage sections are configured on a memory provided in the given processor.

7. A method of retrieving data stored in a distributed manner in a memory provided in each of a plurality of processors capable of being added in a database server constituted by the plurality of processors, the method comprising:

an information storing step executed by an information storage section of each of the plurality of processors, for storing a different record in each processor based on a given hash value of a plurality of hash values, one record being formed by key information, the given hash value of the key information, and data which are associated with each other;

a first processor information storing step executed by a first processor information storage section of each of the plurality of processors, for storing current association between each of the plurality of hash values currently stored in the information storage sections provided in all of the plurality of processors and processor identification information identifying a given processor of the plurality of processors having the information storage section in which the given hash value is currently stored;

a second processor information storing step executed by a second processor information storage section of each of the plurality of processors, for storing new association between each of plurality of hash values to be newly stored in the information storing sections provided in all of the plurality of processors including an added processor and processor identification information identifying the given processor having the information storing section in which the given hash value is to be newly stored;

retrieving step executed by retrieving means executing a retrieval process upon receipt of key information as a condition for retrieval from outside, the retrieval process comprising the steps of calculating the given hash value from the key information, acquiring the processor identification information associated with the given hash value from the first processor information storage section, and acquiring data associated with the given hash value when the given hash value is stored in the information storing section of the given processor identified by the processor identification information; and a storage control step executed by a storage control section of each of the plurality of processors, for exercising control to relocate the record therein by referring to the second processor information storage section to acquire the given hash value stored in association with the processor identification information identifying the given processor itself, acquiring the processor identification information stored in association with the given hash value acquired from the first processor information storage section, acquiring the record having the given hash value from the acquired information storage section of the given processor identified by the processor identification information, and storing the acquired record in the information storing section of the given processor itself;

wherein the retrieving means executes the retrieval process with using at least the first processor information storage section until the storage control section completes relocation of the record among the plurality of processors with using the first processor information storage section and the second processor information storage section after the added processor is added;

wherein the plurality of processors serve as a master processor and remaining slave processors, respectively, the method further comprising:

an insertion step executed by the master processor, for inserting new association between each of the plurality of hash values to be newly stored in the information storing sections provided in all of the plurality of processors including the added processor and processor identification information identifying the given processor having the information storing section in which the given hash value is to be newly stored, as update information to be stored in the second processor information storage section of each of the slave processors;

a step executed by the second processor information storage section of each of the slave processors, for storing the inserted update information when the update information is inserted from the master processor; and a step executed by the storage control section of each of the slave processors, when the storage of the inserted update information is completed, for starting relocation of records from the information storing sections of other processors to the given processor itself based on the processor identification information stored in the second processor information storage section.

8. A method of retrieving data according to claim 7, comprising a retrieval step executed by each of the plurality of processors upon receipt of key information as a condition for retrieval from outside, the retrieval step comprising the step of acquiring the processor identification information associated with the given hash value from the second processor information storage section when the given hash value is not stored due to the data relocation among the plurality of processors partly done in the information storage section of the processor identified by the processor identification information acquired from the first processor information storage section and acquiring data associated with the key information and the given hash value from the information storage section provided in the given processor identified by the processor identification information acquired from the second processor information storage section.

9. A method of retrieving data according to claim 7, comprising:

a signal transmission step executed by each of the plurality of processors, for transmitting a signal notifying the master processor of the completion of relocation when the storage control section has completed relocation of all records; and a switching control step executed by the master processor, for exercising control to delete contents stored in the first processor information storage sections and to effect switching between the second processor information storage sections and the first processor information storage sections when the signal indicating the completion of data relocation is received from the signal transmission sections of all the plurality of processors.

10. A method of retrieving data according to claim 8, wherein the information retrieval step is executed by the plurality of processors according to a preset order.

11. A method of retrieving data according to claim 10, wherein an order in which the plurality of processors execute the information retrieval step is based on a round-robin method.

12. A method of retrieving data according to claim 7, wherein the information storing step and the processor information storing steps are executed by the information storage section and the processor information storage sections configured on a memory provided in the given processor.

13. A computer storage device for causing each processor of a plurality of processors of a database server constituted by the plurality of processors capable of being added to execute:

an information storing step for storing a different record in each processor based on a given hash value of a plurality of hash values, one record being formed by key information, the given hash value of the key information, and data which are associated with each other;

a first processor information storing step for storing current association between each of hash values currently stored in all of the plurality of processors at the information storing step and processor identification information identifying a given processor of the plurality of processors in which the given hash value has been stored at the information storing step;

a second processor information storing step for storing new association between each of the plurality of hash values to be newly stored in all of the plurality of processors including an added processor as a result of the execution of the information storing step and processor identification information identifying the given processor in which the given hash value is to be newly stored as a result of the execution of the information storing step;

retrieving step executed by retrieving means executing a retrieval process upon receipt of key information as a condition for retrieval from outside, the retrieval process comprising the steps of calculating the given hash value from the key information, acquiring the processor identification information associated with the given hash value from the first processor information storage section, and acquiring data associated with the given hash value when the given hash value is stored in the information storing section of the given processor identified by the processor identification information; and a storage control step for exercising control to relocate the record by acquiring the given hash value stored in association with the processor identification information identifying the given processor itself from the information stored at the second processor information storing step, acquiring the processor identification information stored in association with the given hash value acquired from the information stored at the first processor information storing step, acquiring the record having the given hash value from the acquired information stored in the given processor identified by the processor identification information at the information storing step, and executing the information storing step by the given processor itself to store the acquired record therein;

wherein the retrieving means executes the retrieval process with using at least the first processor information storage section until the storage control section completes relocation of the record among the plurality of processors with using the first processor information storage section and the second processor information storage section after the added processor is added;

wherein the plurality of processors serve as a master processor and remaining slave processors, respectively, the program comprising the steps of:

causing the master processor which executes an insertion step for inserting new association between each of the plurality of hash values to be newly stored in the information storing sections provided in all of the plurality of processors including the added processor and processor identification information identifying the given processor having the information storing section in which the given hash value is to be newly stored, as update information to be stored in the second processor information storage section of each of the slave processors;

causing each of the slave processors to execute the second processor information storing step to store the inserted update information when the update information is inserted from the master processor; and causing each of the slave processors to further execute the storage control step, when the storage of the inserted update information is completed, to start relocation of records from the information storing sections of other processors to the given processor itself based on the processor identification information stored in the second processor information storage section.

14. A computer storage device having a program according to claim 13 stored therein, the program causing each of the plurality of processors to execute a retrieval step upon receipt of key information as a condition for retrieval from outside, the retrieval step comprising the step of acquiring the processor identification information associated with the given hash value from information stored at the second processor information storing step when the given hash value has not been stored due to the data relocation among the plurality of processors partly done in the given processor identified by the processor identification information at the information storing step acquired from the first processor information storage section and acquiring data associated with the key information and the given hash value stored in the given processor identified by the processor identification information at the information storing step acquired from the second processor information storage section.

15. A computer storage device having a program according to claim 13 stored therein, the program comprising the steps of:
  causing each of the plurality of processors to execute a signal transmission step for transmitting a signal notifying the master processor of the completion of relocation when relocation of all pieces of data has been completed at the storage control step; and
  causing the master processor to execute a switching control step for exercising control to delete contents stored at the first processor information storing step and to effect switching between the contents stored at the second processor information storing step and the contents stored at the first processor information storing step when the signal transmission step is executed by all the plurality of processors and a signal indicating the completion of data relocation is received.

16. A computer storage device having a program according to claim 14 stored therein for causing the plurality of processors to execute the information retrieval step according to a preset order.

17. A computer storage device having a program according to claim 16 stored therein for causing the plurality of processors to execute the information retrieval step in an order determined based on a round-robin method.

18. A computer storage device having a program according to claim 13 stored therein for causing each of the plurality of processors to execute the information storing step and the processor information storing steps such that the contents stored at the information storing step and the processor information storing step are stored in a memory provided in the given processor.

* * * * *